United States Patent
Cushman et al.

[15] 3,700,986
[45] Oct. 24, 1972

[54] CO-ORDINATED VOLTAGE CONTROL FOR INDUCTION SERVOMOTORS

[72] Inventors: Paul G. Cushman; Albert A. Clark, both of Pittsfield, Mass.

[73] Assignee: General Electric Company

[22] Filed: Jan. 18, 1971

[21] Appl. No.: 107,347

[52] U.S. Cl. .................... 318/227, 318/230, 318/231
[51] Int. Cl. ............................................... H02p 5/40
[58] Field of Search ...................... 318/227, 230, 231

[56] References Cited

UNITED STATES PATENTS

| | | | |
|---|---|---|---|
| 3,593,083 | 7/1971 | Blaschke | 318/230 |
| 3,372,323 | 3/1968 | Guyeska | 318/230 |
| 3,529,223 | 9/1970 | Vergez, Jr. | 318/230 |
| 3,500,158 | 3/1970 | Landau et al. | 318/230 X |
| 3,512,067 | 5/1970 | Landau | 318/230 X |

*Primary Examiner*—Gene Z. Rubinson
*Attorney*—John F. McDevitt, Frank L. Neuhauser, Oscar B. Waddell and Joseph B. Forman

[57] ABSTRACT

A system for control of an induction motor at all speed and load conditions through the application of stator voltages which are co-ordinated with respect to magnitude, frequency and phase to maintain rated flux and a quadrature special relationship between air-gap flux and rotor current.

6 Claims, 5 Drawing Figures

INVENTORS
PAUL G. CUSHMAN
ALBERT A. CLARK
BY J.F. McDevitt
THEIR ATTORNEY

INVENTORS
PAUL G. CUSHMAN
ALBERT A. CLARK

BY *J.F. McDevitt*

THEIR ATTORNEY

CO-ORDINATED VOLTAGE CONTROL FOR INDUCTION SERVOMOTORS

BACKGROUND OF THE INVENTION

1. Field of the Invention

The invention relates to a system for controlling the magnitude, frequency and phase of voltages applied to an induction motor for servo-control of the motor.

2. Description of the Prior Art

A mere change of input frequency is not sufficient to adequately control the speed of an induction motor. It has long been recognized that, to prevent excessive current due to lower impedance at lower frequency, it is necessary to vary the supply voltage with the input frequency.

Now, since modern high current transistors and silicon controlled rectifiers have come into wide use, it is realized that, for accurate use in servo-mechanism applications, more accurate compensation for various nonlinearities is required. Maintaining volts/hertz constant is usually sufficient at higher speeds, but allows sloppy or rough response at lower speeds. Discussions of induction motor operation are presented in the IEEE Transactions on Power Apparatus and Systems, Vol. PAS-84, Nov. 1965, page 1038–1053 and 1080–1086.

SUMMARY OF THE INVENTION

In the present invention, smoother and more accurate control is accomplished by calculating the magnitudes, frequencies and phase angles of the stator voltages for an induction motor as a function of required speed and slip. Driving voltages having these values are then obtained by amplification for application to the stator. Thus the proper air-gap flux and current spatial relationships can be maintained under all operating conditions.

The calculation of the required voltages is performed in terms of the classical direct and quadrature axis co-ordinate system, in which an actual electric motor with a polyphase stator winding is treated as an equivalent two-phase machine to simplify the performance equations. In synchronous machine analysis, the direct and quadrature axes are usually attached to the rotor which is frequently salient in configuration, and rotate with the rotor. In induction motor analysis, considerably more freedom exists in the choice of axis location (see references in Prior Art) but in this system the direct axis is chosen to be aligned to and rotate with the resultant stator flux. Furthermore, the applied voltages are adjusted at all load and speed conditions to maintain rated flux in the direct axis and negligible flux in the quadrature axis. This condition is accomplished ideally by rated excitation current in the stator direct axis and by zero current in the rotor direct axis. Also under load conditions the applied voltages are adjusted such as to cause equal and opposite currents to flow in the quadrature axis stator and rotor circuits. This causes negligible buildup of quadrature axis flux but does cause torque through the interaction of quadrature axis current and direct axis flux.

The required voltages and currents, which are calculated on the basis of direct and quadrature axes values are readily converted to actual machine quantities by resolution as will be shown in the FIG. 1 description.

Three embodiments of the invention are described. In the first embodiment, the required direct and quadrature axis voltages are calculated directly from the speed and load (i.e., slip) conditions, resolved to stator axes and applied to the stator windings.

In the second embodiment of the invention a high gain current control loop is employed. The required direct and quadrature axis currents are computed from speed and load conditions, compared with measured values (as resolved from measured stator currents) and the differences amplified to generate direct and quadrature axis voltages which are resolved to stator axes.

The third embodiment represents an electromechanical control system of the present invention.

DESCRIPTION OF THE PREFERRED EMBODIMENTS

Figure 1:
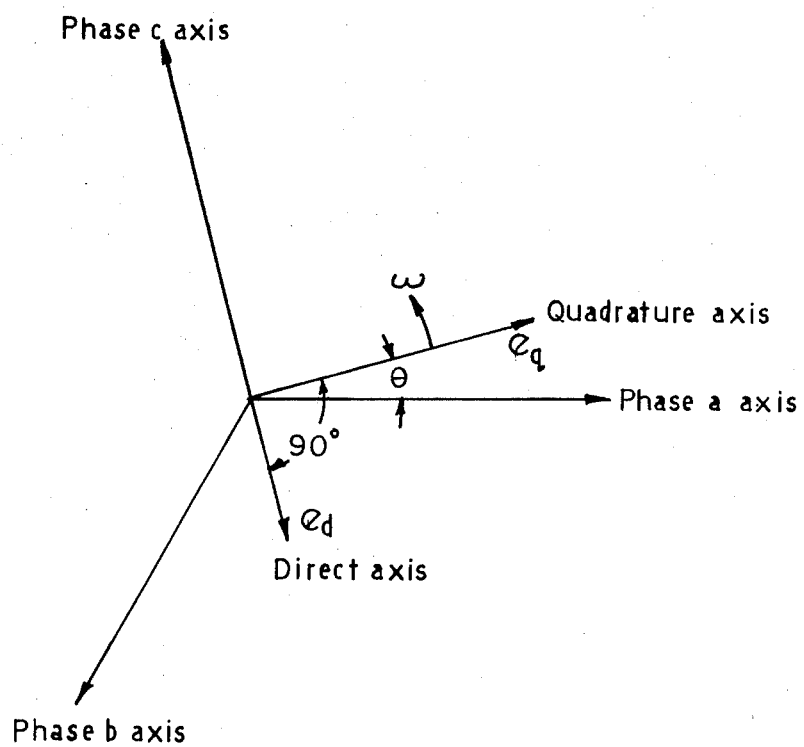
FIG. 1 is a vector diagram showing the relationships between the coordinate systems of the rotating flux and the stationary stator windings.
Figure 2:
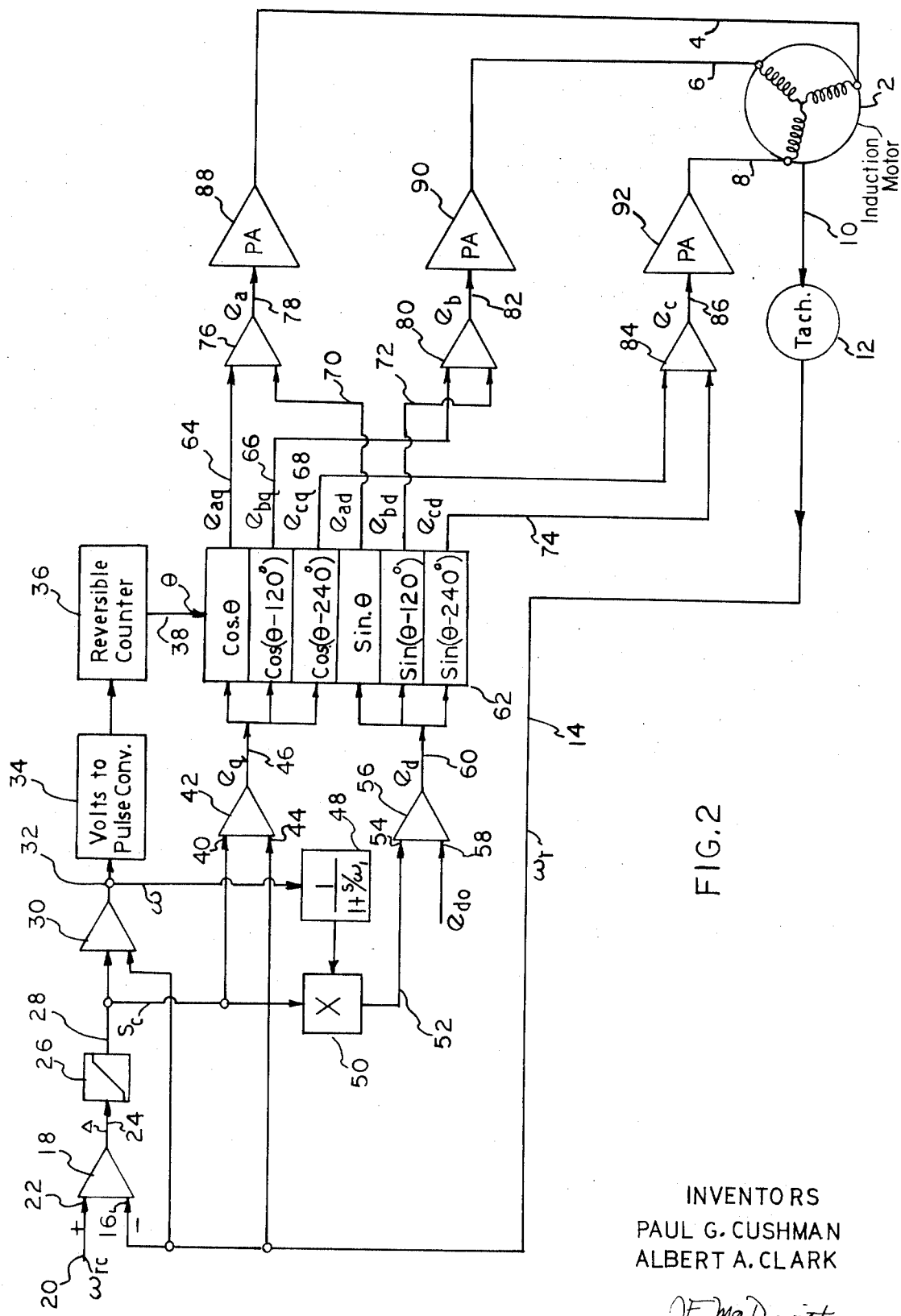
FIG. 2 is a schematic diagram of an electronic system for controlling voltages applied to an induction motor constituting a preferred embodiment of the invention.

FIG. 1 is a vector diagram showing the relationships between the direct/quadrature co-ordinate system, rotating with the flux, and the stationary co-ordinate system of the stator windings. Shown also are vectors $e_q$ and $e_d$ along the quadrature and direct axes, representing the magnitudes of the quadrature and direct axis voltages for a particular speed and load condition. The flux and direct and quadrature axes are rotating at angular rate $\omega$. $\theta$ is the angle between the quadrature axis and phase a axis. The required phase voltages are:

$e_a = e_d \sin \theta + e_q \cos \theta$
$e_b = e_d \sin (\theta - 120°) + e_q \cos (\theta - 120°)$
$e_c = e_d \sin (\theta - 240°) + e_q \cos (\theta - 240°)$ FIG. 2 discloses a system for controlling the voltages applied to an induction motor 2 by means of an electronic control system. The motor 2 has three stator winding input terminals 4, 6 and 8 and an output shaft 10. A tachometer generator 12 is connected to shaft 10 and is driven thereby to provide an output signal on line 14 indicative of the rotational rate $\omega_r$ of the motor, shaft and generator. The signal on line 14 is applied to one input terminal 16 of a differential amplifier 18. Another signal is applied on line 20 to terminal 22 of amplifier 18 to represent the desired, or commanded, rotational rate $\omega_{rc}$ for motor 2. The amplifier 18 provides a difference, or error signal $\Delta$ on its output line 24. This value is represented by equation $\Delta = G_A (\omega_{rc} - \omega_r)$, where $G_A$ is the gain of amplifier 18. This error signal $\Delta$ indicates a commanded slip which must be introduced to the motor speed in order to have the rotor go at the commanded speed. The commanded slip must be limited to less than the value at which maximum torque occurs to insure that the motor operates in an efficient manner. Thus the signal $\Delta$ on line 24 is passed through a two-sided limiter 26 to provide a limited slip command $S_c$ on line 28.

The limited slip command $S_c$ on line 28 is applied to one input terminal of a summing amplifier 30 to be added to the tachometer feedback signal $\omega_r$ on line 14. The signal $\omega$ from amplifier 30 on line 32 is then represented by equation $$\omega = n(\omega_r + S_c)$$

where $\omega$ is proportional the frequency in radians per second, of the stator voltage to be applied to the induction motor and $n$ is the number of pairs of poles in the induction motor. Amplifier 30 introduces the constant $n$ to the equation as a fixed amplification factor.

The signal $\omega$ which is a voltage value at line 32, is introduced into a voltage-to-pulse-frequency converter 34 which derives a train of pulses having a frequency proportional to $\omega$. These pulses are then applied to a reversible counter 36, which derives an output signal $\theta$ on line 38 which represents the rotational phase angle of one of the three stator voltages to be applied to the motor. The other two stator voltages are related in phase to this one by fixed values of $-120°$ and $-240°$ respectively. This counter can have as many stages as needed to incrementally break down the possible values of $\theta$ to the desired degree of accuracy.

Having derived the frequency and time phase of the voltage to be applied to the motor stator, the magnitude of the stator voltage to maintain the desired flux in the motor under the existing speed and load (that is, slip) conditions must be determined. As previously described, this solution is made in terms of quadrature, $e_q$, and direct, $e_d$, axis quantities of the equivalent machine for later resolution into actual phase voltage magnitudes.

The signal $S_c$ on line 28 is applied to input terminal 40 of an amplifier 42. To the other input terminal 44 of this amplifier, the signal $\omega_r$ is applied through an input impedance (not illustrated). Controlled by its input impedances and feedback impedance (also not illustrated), amplifier 42 produces a signal $e_q$ (quadrative axis voltage) on output line 46. The value of this signal is given by the equation $$e_q = \left\{\frac{\sqrt{2}V}{\Omega}\right\}\left\{n\omega_r + \left(1 + \frac{rs}{r_r}\frac{ks}{k_r}\right)nS_o\right\}$$

where the following predetermined constants are introduced by setting the input and feedback impedances in accordance with the constant parameters of the motor to be controlled:

$V$ is the rms rated value of $1-n$ (Y terminal to center) voltage $\Omega$ is the rated frequency $r_s$ and $r_r$ are respectively stator and rotor $1-n$ resistances $k_s$ and $k_r$ are respectively stator and rotor coupling coefficients.

A filter 48, having an operational characteristic $1/(1 + s/\omega_1)$, is used to smooth the signal $\omega$ before passing it on to one input of a multiplier 50. The signal $S_c$ is applied to the other input of a multiplier 50. The signal $S_c$ is applied to the other input of the multiplier to provide a signal $\omega S_c$ on the output line 52. This signal is applied through an input impedance (not illustrated) to an input terminal 54 of an amplifier 56. A constant signal $e_{do}$ is applied through an input impedance to a second input terminal 58 of amplifier 56. The amplifier also has a feedback impedance (not illustrated) to cause the generation of an output signal $e_d$ (direct axis voltage on an output line 60, where $e_d$ is given by an equation $$e_d = \sqrt{2}Ir_s - \frac{\sqrt{2}V}{\Omega}\frac{L_r}{r_r}(1-k_sk_r)n^2\omega S_o$$

where $I$ is the rms rated no-load current, and $L_r$ is the rotor phase inductance. Thus it is seen that $\sqrt{2}\,Ir_s$ is a constant, representing the input to terminal 58, and $$\frac{\sqrt{2}V}{\Omega}\frac{L_r}{r_r(1-k_sk_r)n^2}$$

is a constant from the scaling factor at terminal 54. Only $\omega$ and $S_c$ are variable inputs to amplifier 56.

Figure 5:
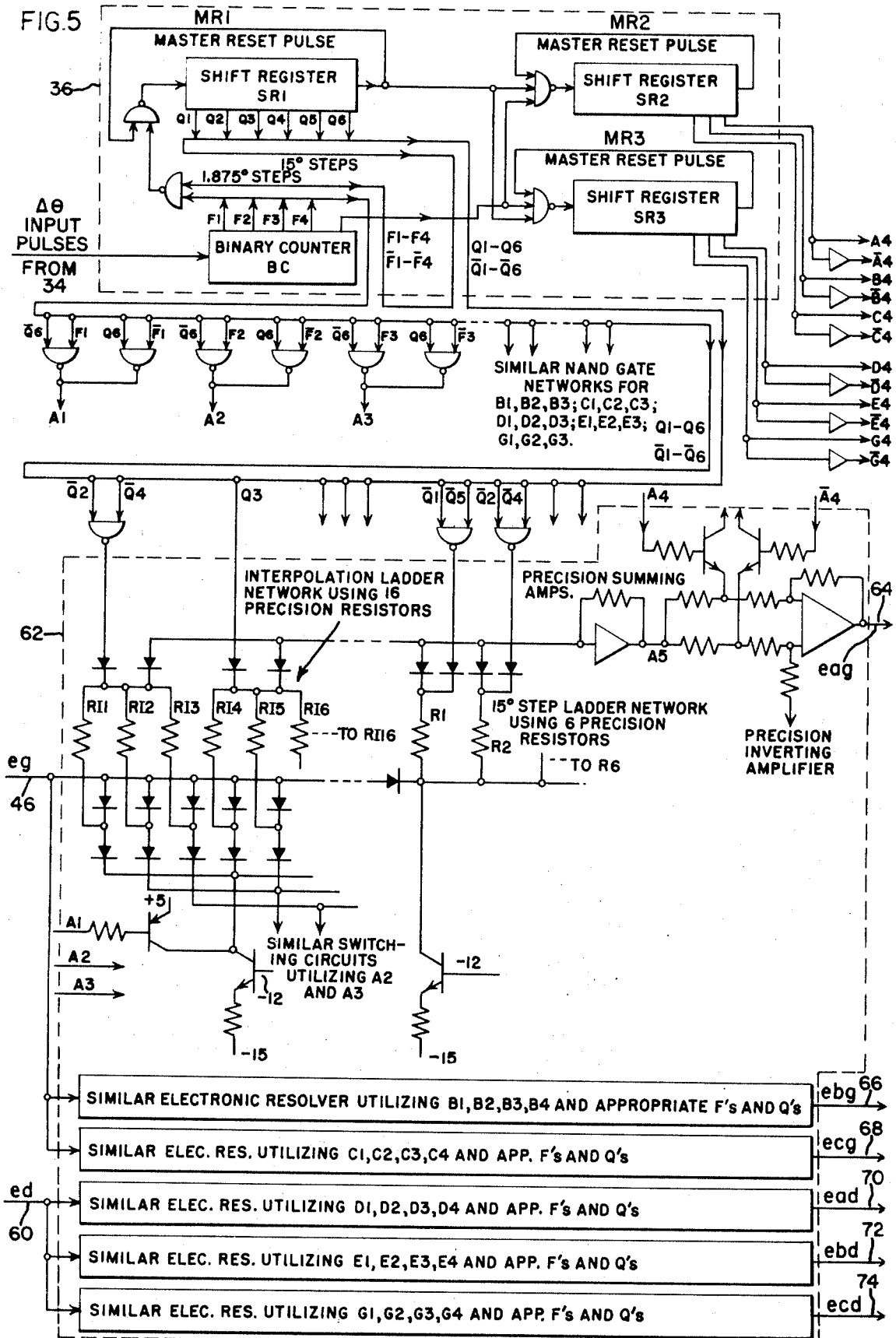
FIG. 5 is a schematic diagram of a reversible counter and digital resolver usable in the implementation of the embodiments of the invention as illustrated in FIGS. 2 and 3.

The signals $e_d$ and $e_q$ represent the direct and quadrature voltage values to be applied to the motor. A resolver 62 is used to resolve the $e_d$ and $e_q$ voltages into the phase voltages $e_a$, $e_b$ and $e_c$. The resolver receives the angular information $\theta$ and the magnitude information $e_d$ and $e_q$ to produce signals $e_{ad}$, $e_{bd}$, $e_{cd}$, $e_{aq}$, $e_{bq}$ and $e_{cq}$ respectively on output lines 64, 66, 68, 70, 72 and 74, where $e_{ad} = e_d \cos\theta$
$e_{bd} = e_d \cos(\theta - 120°)$
$e_{cd} = e_d \cos(\theta - 240°)$
$e_{aq} = e_q \sin\theta$
$e_{bq} = e_q \sin(\theta - 120°)$
$e_{cq} = e_q \sin(\theta - 240°)$ Further details of the reversible counter and digital resolver are shown in FIG. 5. The circuitry is largely comprised of integrated solid state components and employs the general techniques described in IEEE Transactions on Instrumentation and Measurements, Vol. IM-18, No. 2, June 1960, "Digital Generation of Low-Frequency Sine Waves."

The digital resolvers used are essentially conventional digital to analog converters comprising ladder networks of precision resistors, except that the resistor values are selected to provide sinusoidally varied outputs rather than linear outputs and variable reference voltages are used rather than fixed voltages. Typically, the sinusoidal functions are developed as 15° steps of a sine wave with eight step linear interpolation between these 15° steps. Basically positive sine waves are generated such as from 0° to 180° and the negative portions are obtained by inverting the outputs over the appropriate angle regions.

The $\Delta\theta$ pulses are supplied to the reversible counter, with appropriate scaling as described previously. Typical scaling used in experimental test models of the system employed $\Delta\theta$ step sizes of 1.875°. These $\Delta\theta$ steps enter a four stage binary counter with binary stage outputs F1, F2, F3, and F4. The "not" functions $\overline{F1}$, $\overline{F2}$, $\overline{F3}$ and $\overline{F4}$ are also obtained by passing F1, F2, F3, F4 through inverting amplifiers not shown in FIG. 5. The F1-F4 and $\overline{F1}$-$\overline{F4}$ states are utilized in the eight step linear interpolation between 15° increments of the sine wave. The output of the binary counter feeds into a six stage shift register, SR1, having stage outputs Q1-Q6, corresponding to the 15° steps in a sine wave from 0° to 90°. Beyond 90°, SR1 is caused to "count backwards" thus utilizing the same values obtained from 0° to 90°. The "not" states $\overline{Q1}$-$\overline{Q6}$ are also formed by passing the Q1-Q6 states through inverting amplifiers, not shown in FIG. 5. The outputs of BC and SR1 are combined as inputs to shift registers SR2 and SR3. These shift registers form states A4, B4, C4 occuring at 0°, 60°, and 120° and shifting at 180°, 240° and 300° and states D4, E4, G4 occuring at 90°, 150°, 210° and shifting at 270°, 330°, and 30°. The inverse states $\overline{A4}$, $\overline{B4}$, $\overline{C4}$, $\overline{E4}$, $\overline{G4}$ are also formed using inverting amplifiers. The six states A4, B4, C4, D4, E4, G4 and their inverses are used for switching signs to obtain the negative halves of the three phase cosine and sine waves.

The states of the binary counter, BC, and shift register, SR1, are utilized through NAND gate logic to switch in appropriate resistors of the precision resistor ladder networks. Representative logic is illustrated in FIG. 5. SR1 state Q6 and BC states F1, F2, F3 are utilized to generate the main interpolation switching signals A1, A2, A3. these signals are utilized in transistor-diode switching networks to switch in appropriate groups of precision resistors, RI1 to RI16. Specific resistors of these groups are further selected by appropriate combinations of Q signals. The signals A1, A2, A3 are utilized in the development of $e_{aq} = e_d \cos \theta$. Similar logic is used to develop B1, B2, B3; C1, C2, C3; D1, D2, D3; E1, E2, E3; and G1, G2, G3.

The states of SR1 are utilized through NAND gate logic to select appropriate precision resistors, R1 through R6, corresponding to 15° steps in the sine wave generation. All of the switched precision resistors of the R1 through R6 ladder or the RI1 through RI16 ladder are input resistors of the precision summing amplifier with output signal A5. A5 is an analog signal having the absolute magnitude of $e_q \cos \theta$. This signal, or its inverse, is selected through the application of the state signals A4 and $\overline{A4}$ to to obtain the complete sine wave with both positive and negative values.

The remaining five blocks of ladder networks, summing amplifiers and inverting amplifiers are identical to the one just described. However, they utilize different input control signals, which are of the same form as the input signals just described but are displaced in phase.

The signals $e_{ad}$ and $e_{aq}$ are summed in an amplifier 76 to provide a signal $e_a$ on output line 78; the signals $e_{bd}$ and $e_{bq}$ are summed in an amplifier 80 to provide a signal $e_b$ on output line 82; and signals $e_{cd}$ and $e_{cq}$ are summed in an amplifier 84 to provide a signal $e_c$ on output line 86. Signals $e_a$, $e_b$ and $e_c$ are respectively amplified in power amplifiers 88, 90 and 92 for application to motor terminals 4, 6 and 8 to drive the motor.

Figure 3:
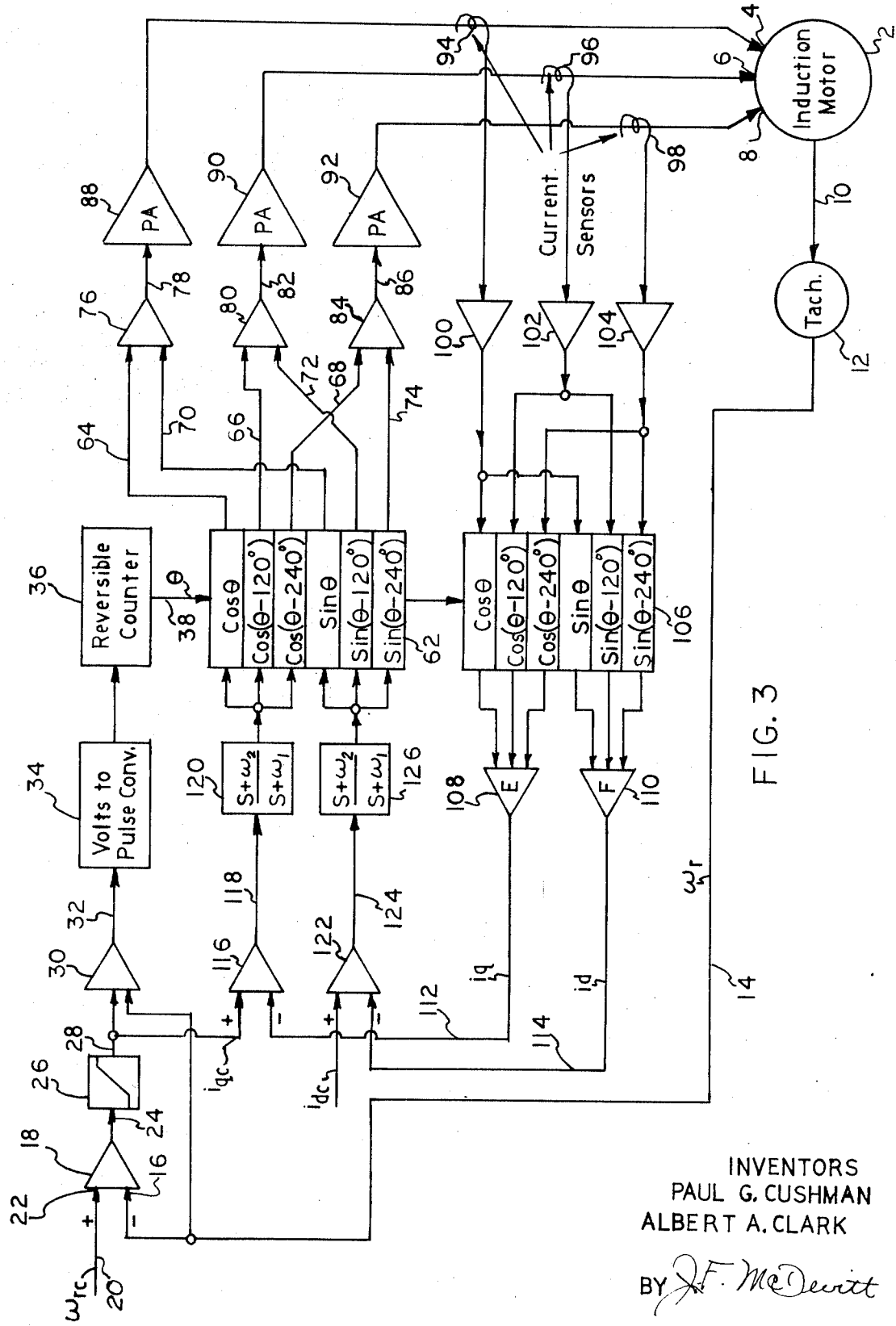
FIG. 3 is a schematic diagram of an electronic system for controlling currents applied to an induction motor constituting another embodiment of the invention.

Because tolerances or changes in the motor parameters on the order of ±20 percent can cause significantly degraded performance, the system of FIG. 3 has been devised to correct for such changes, particularly those caused by temperature changes. Current changes caused by temperature changes are measured by current sensors 94, 96 and 98 to provide feedback signals for correction of the control values. The system of FIG. 3 operates by controlling current magnitude rather than voltage magnitude as in FIG. 2. The signals from current sensors 94, 96, and 98 are amplified by amplifiers 100, 102 and 104, respectively, and are applied as the various inputs of a second resolver 106. The second resolver breaks the three current signals into direct and quadrature components, applying the three quadrature-axis signals to a quadrature summing amplifier 108 and the three direct-axis signals to a direct summing amplifier 110. A total quadrature-axis current signal $i_q$ is provided from amplifier 108 on line 112, and a total direct-axis current signal $i_d$ is provided from amplifier 110 on line 114.

In the device of this figure, the output from limiter 26 is a signal $i_{qc}$ representing commanded quadrature current. The commanded quadrature current $i_{qc}$ is compared with the actual quadrature current $i_q$ in a difference amplifier 116 to generate a quadrature-axis current error signal on line 118. This error is compensated by a circuit 120 having an operational characteristic $(s + \omega_2)/(s + \omega_1)$ to provide a compensated output to resolver 62.

A differential amplifier 122 receives a fixed direct-axis commanded current signal $i_{dc}$ and the actual direct-axis current signal $i_d$ and generates a direct axis current error signal on line 124. The signal from line 124 is compensated by a circuit 126 having an operational characteristic $(s + \omega_2)/(s + \omega_1)$ to provide a compensated output to resolver 62. Compensation circuits 120 and 126 are constructed to operate at DC levels.

While the circuit according to FIG. 3 is just as sensitive to errors in the frequency channel as that of FIG. 2 it is otherwise much more accurate in the presence of deviation from tolerance values.

Figure 4:
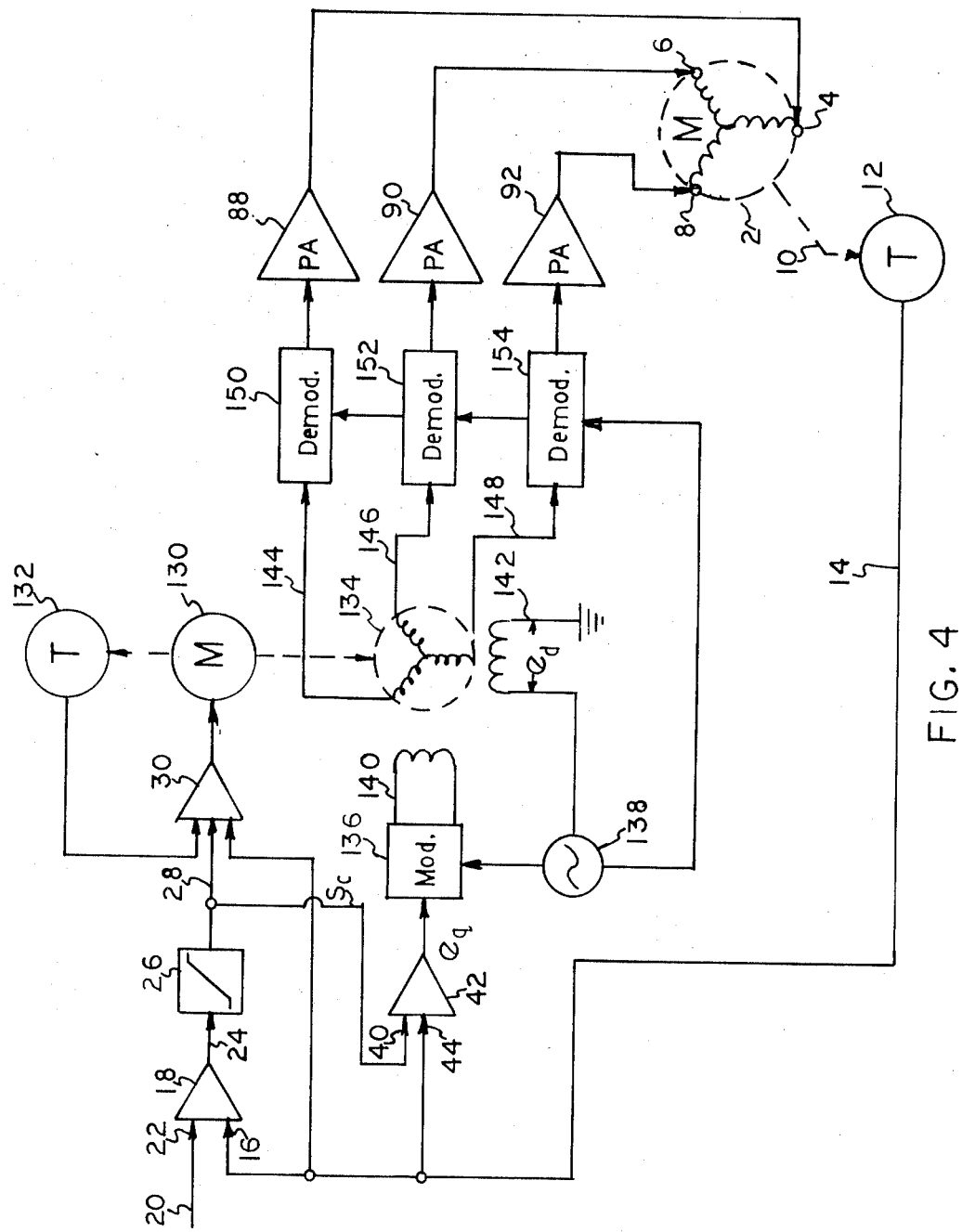
FIG. 4 is a schematic diagram of an electromechanical system for controlling an induction motor constituting still another embodiment of the invention.

FIG. 4 illustrates an electromechanical embodiment of the invention in which a motor 130 and feedback tachometer 132 are used to provide angle information to an electromechanical resolver 134. Parts numbered the same as those in FIG. 2 have similar functions.

The tachometer 132 measures the speed of motor 130 and provides a feedback signal to amplifier 30 to cause a signal from amplifier 30 to drive motor 130 at the commanded speed. A modulator 136 receives a reference sinusoidal signal from a reference oscillator 138 for use as a carrier. The modulating signal $e_8$ is supplied by amplifier 42 to generate a modulated output signal in a quadrature stator winding 140 of the two-phase to three-phase resolver 134. The reference oscillator 138 also provides a constant output signal $e_d$ to a direct stator winding 142 of the resolver. If the rotor resistance of the controlled induction motor 2 is high, satisfactory results can be obtained without the necessity of varying the value of the direct axis signal $e_d$ as was done in the systems of FIGS. 2 and 3.

The three-phase output of the resolver is provided on lines 144, 146 and 148, respectively to demodulators 150, 152 and 154. The demodulators receive the reference carrier signal from oscillator 138 for use in stripping the signal from the carrier, thereby providing the three-phase stator control signals to power amplifiers 88, 90 and 92 for driving motor 2.

It will be apparent from the foregoing description that variations can be made in the control system without departing from the true spirit and scope of this invention. For example, a digital feedback loop could be utilized in said control system having pulse to voltage conversion means for derivation of the direct-axis and quadrature-axis adjustment signals. It is not intended to limit the invention, therefore, to the scope of the preferred embodiments above described since it will be apparent that various modifications are possible within the scope of the appended claims.

What is claimed as new and desired to be secured by Letters Patent of the United States is:

1. A system for controlling the magnitudes, frequencies and phases of voltages applied to a plurality of power input terminals of an induction motor comprising
   A. means for generating a signal ($\omega_r$) representing the actual speed of said induction motor,
   B. means for receiving a signal ($\Omega_{rc}$) representing the desired speed of said induction motor and for comparing said desired speed signal with said actual speed signal to provide a difference signal ($\Delta$),
   C. means for limiting the difference signal to provide a limited slip command signal ($S_c$),
   D. means responsive to the sum of the actual speed signal and the limited slip signal for generating a signal proportional to the stator voltage frequency,
   E. means for generating a variable quadrature-axis signal by summing a feedback quantity from said motor with the limited slip command signal,
   F. means for generating a direct-axis signal,
   G. means for resolving the direct-axis and quadrature-axis signals into a corresponding pluraltiy of phase voltages at angles determined by said signal proportional to the stator voltage frequency, and
   H. means responsive to said phase voltages for applying said voltages to said plurality of power input terminals.

2. A system according to claim 1 wherein said means for generating a signal proportional to the stator voltage frequency comprises
   A. means for deriving a first signal having a magnitude proportional to the sum of the actual speed signal and the limited slip signal,
   B. means for converting the first signal to a second signal having a pulse repetition rate proportional to the magnitude of the first signal, and
   C. counter means responsive to the second signal to generate an angle signal to control said resolving means.

3. A system according to claim 1 wherein said means for generating a signal proportional to the stator voltage frequency comprises
   A. a small motor having an output shaft connected to drive said resolving means,
   B. a tachometer for measuring the speed of said shaft and generating a tachometer output signal, and
   C. means for driving said small motor with a signal proportional to the actual speed signal plus the limited slip signal minus the tachometer output signal.

4. A system according to claim 1 wherein said feedback quantity is the actual speed signal.

5. A system according to claim 4 wherein said means for generating said direct-axis comprises
   A. multiplier means responsive to said limited slip command signal and the signal proportional to the stator voltage frequency for generating a product signal, and
   B. means for summing said product signal and a constant signal to provide said direct-axis signal.

6. A system according to claim 1 further comprising
   A. means for sensing the current applied to said power input terminals to provide three current-measurement signals,
   B. resolving means for breaking each of said three signals into direct-axis and quadrature-axis components,
   C. means for respectively summing all the direct-axis and all the quadrature-axis components to produce a direct-axis feedback signal ($i_d$) and a quadrature-axis feedback signal ($i_q$), wherein said quadrature-axis feedback signal is said feedback quantity wherein said means for generating a direct-axis signal comprises means for summing said direct-axis feedback signal with a constant signal to generate said direct-axis signal.

* * * * *